US007809567B2

(12) United States Patent
Ju et al.

(10) Patent No.: US 7,809,567 B2
(45) Date of Patent: Oct. 5, 2010

(54) SPEECH RECOGNITION APPLICATION OR SERVER USING ITERATIVE RECOGNITION CONSTRAINTS

(75) Inventors: Yun-Cheng Ju, Bellevue, WA (US); David G. Ollason, Seattle, WA (US); Siddharth Bhatia, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1481 days.

(21) Appl. No.: 10/897,817

(22) Filed: Jul. 23, 2004

(65) Prior Publication Data

US 2006/0020464 A1   Jan. 26, 2006

(51) Int. Cl.
    *G10L 15/18* (2006.01)
(52) U.S. Cl. .................................... 704/257
(58) Field of Classification Search ................. 704/257
    See application file for complete search history.

(56) References Cited

U.S. PATENT DOCUMENTS

| 5,638,425 A * | 6/1997 | Meador et al. ........... 379/88.01 |
| 5,712,957 A * | 1/1998 | Waibel et al. ............... 704/240 |
| 5,855,000 A * | 12/1998 | Waibel et al. ............... 704/235 |
| 5,963,903 A | 10/1999 | Hon et al. ..................... 704/254 |
| 6,064,959 A * | 5/2000 | Young et al. ................. 704/251 |
| 6,263,308 B1 | 7/2001 | Heckerman et al. ......... 704/231 |
| 6,298,324 B1 * | 10/2001 | Zuberec et al. .............. 704/251 |
| 6,301,560 B1 * | 10/2001 | Masters ........................ 704/251 |
| 6,542,866 B1 | 4/2003 | Jiang et al. ................... 704/255 |
| 6,571,210 B2 | 5/2003 | Hon et al. ..................... 704/251 |
| 6,650,735 B2 | 11/2003 | Burton et al. ............... 379/88.1 |
| 6,694,296 B1 | 2/2004 | Alleva et al. ................. 704/255 |
| 6,697,769 B1 | 2/2004 | Goodman et al. ............... 703/2 |
| 7,181,387 B2 * | 2/2007 | Ju et al. ........................... 704/9 |
| 7,299,181 B2 * | 11/2007 | Ju et al. ........................ 704/257 |
| 7,624,016 B2 * | 11/2009 | Ju et al. ........................ 704/270 |
| 2004/0024601 A1 * | 2/2004 | Gopinath et al. ............ 704/270 |
| 2004/0240633 A1 * | 12/2004 | Sloan ....................... 379/88.16 |
| 2005/0154587 A1 * | 7/2005 | Funari et al. ................. 704/247 |
| 2005/0187768 A1 * | 8/2005 | Godden ....................... 704/238 |

OTHER PUBLICATIONS

Article, "Mail Call: Message Presentation and Navigation in a Non-visual Environment" by Matthew Marx and Chris Schmandt, prior to Jul. 23, 2004.

* cited by examiner

*Primary Examiner*—Susan McFadden
(74) *Attorney, Agent, or Firm*—Joseph R. Kelly; Westman, Champlin & Kelly, P.A.

(57) ABSTRACT

A speech recognition application including a recognition module configured to receive input utterances and an application module configured to select a recognition from the speech recognition module using output from a first iteration to select a recognition result for a second iteration. In one embodiment, the application module eliminates a previous rejected recognition result or results from the N-Best list for recognition. In another embodiment, the application module rescores N-Best entries based upon N-Best lists or information from another iteration. In another illustrated embodiment, the application module uses a limited grammar from a current N-Best list for subsequent recognition, for example for rerecognition using a recorded input from a previous iteration.

18 Claims, 5 Drawing Sheets

SPEECH RECOGNITION APPLICATION OR SERVER USING ITERATIVE RECOGNITION CONSTRAINTS

BACKGROUND OF THE INVENTION

The present invention relates to speech recognition applications such as a voice dialer applications. More particularly, the present invention relates to a speech recognition application using iterative recognition constraints.

Speech recognition applications, such as voice dialers, receive an input utterance that is processed by a speech recognition module to output an N-Best list based upon grammars corresponding to records in a database or directory. The voice dialer application selects one or more of the entries or names in the N-Best list, typically the highest scoring entry, and requests confirmation from the user that the identified name is correct.

Because speech recognition is imperfect, the identified name will often be incorrect. If the user indicates that the name is incorrect, prior art systems ask the user to repeat the name. The prior art systems then perform recognition using the new utterance.

Such systems can be annoying to the user because they can repeatedly identify the wrong person. As such, a system is needed that reduces the burden on the user if the first attempt at recognition fails.

SUMMARY OF THE INVENTION

The present invention relates to a speech recognition application including a speech recognition module configured to receive input utterances and an application module configured to use information associated with a first iteration to select an N-Best entry or entries during a second iteration. The application has particular use for a voice dialer application or system. In one embodiment, the application module eliminates a previously rejected recognition result or results from an N-Best list provided by the speech recognition module during a subsequent iteration. In another embodiment, the application module rescores, N-Best entries of the N-Best list based upon N-Best lists or information from another iterations. In another illustrated embodiment, the application module uses a limited grammar from a current N-Best list for a subsequent recognition, for example for recognition using a recorded input from a previous iteration. As described the application uses previous information from previous recognitions to reduce recognition iterations and increase recognition success.

DETAILED DESCRIPTION OF ILLUSTRATIVE EMBODIMENTS

Computer System Environment

Figure 1:
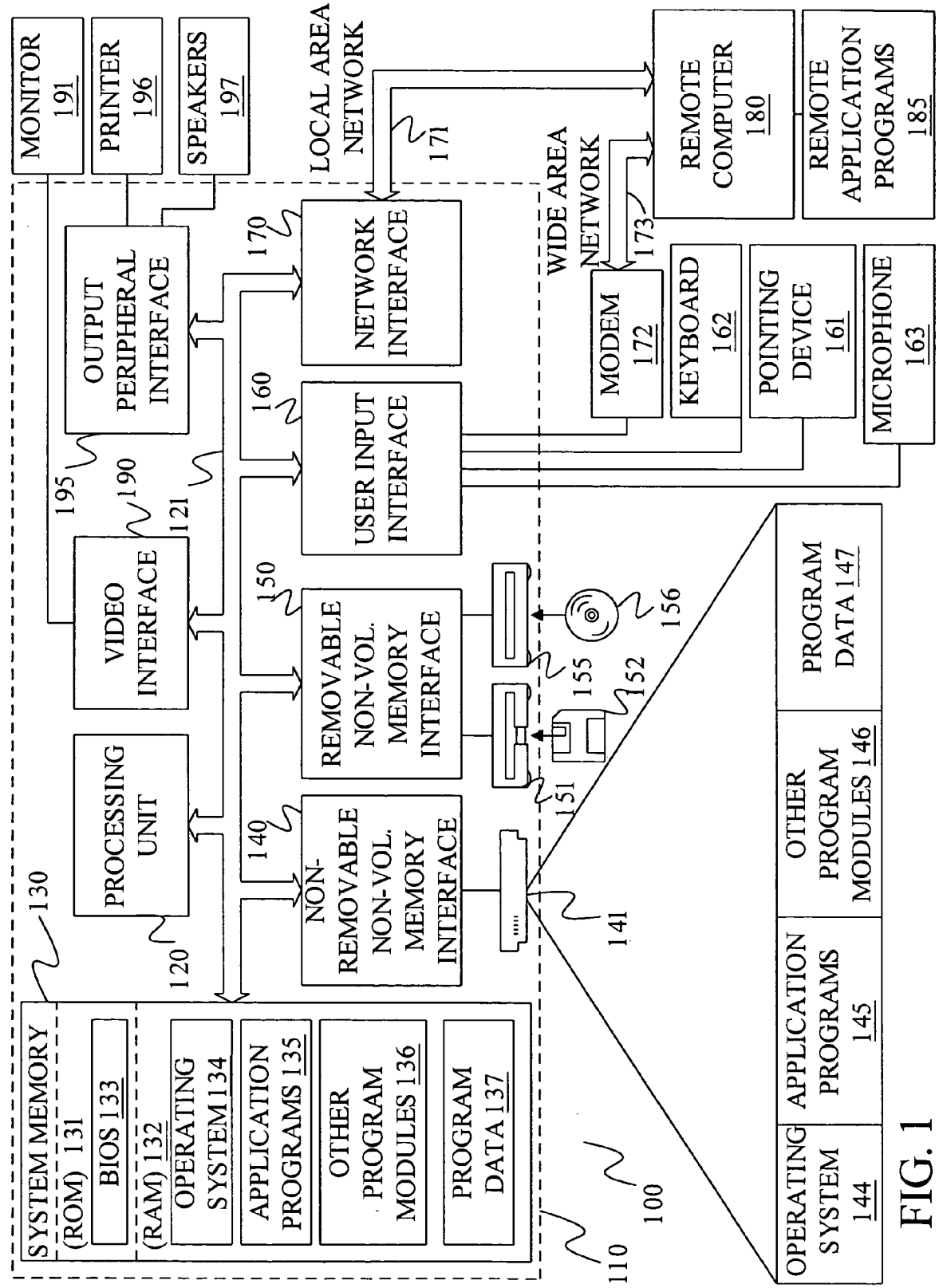
FIG. 1 is a block diagram of one illustrative embodiment of a computer in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. Those skilled in the art can implement aspects of the present invention as instructions stored on computer readable media based on the description and figures provided herein.

The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way o example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, Intranets and the Internet.

When used in a LAN networking environment, the computer 11.0 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that the present invention can be carried out on a computer system such as that described with respect to FIG. 1. However, the present invention can be carried out on a server, a computer devoted to message handling, or on a distributed system in which different portions of the present invention are carried out on different parts of the distributed computing system.

Figure 2:
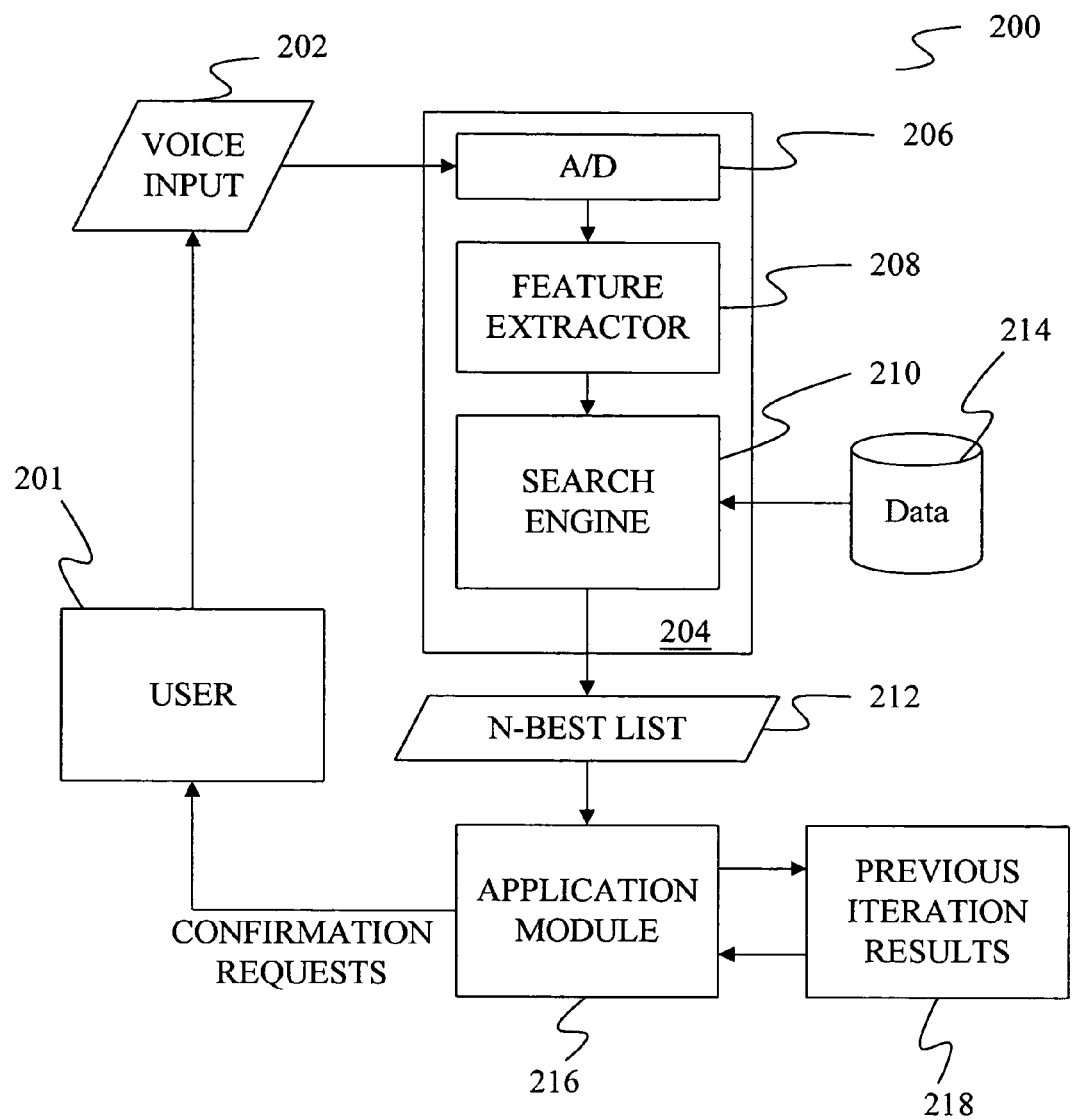
FIG. 2 is a block diagram of a speech recognition application using speech recognition of a voice input or utterance.

The present invention relates to a speech recognition application 200, which as illustrated in FIG. 2 receives a speech input or utterance 202 from a user 201. The speech input or utterance 202 is decoded by a speech recognition module 204 which typically includes an analog to digital (A/D) converter 206 and a feature extractor 208, and a search engine 210. The feature extractor 208 provides feature vectors associated with each frame of speech to search engine 210, which uses the feature vectors to identify an N-best list of names or entries 212 that best match the speech input or utterance 202. In the embodiment described, search engine 210 decodes the speech signal based upon allowed grammars developed from a contact list or database 214 that contains contact information such as name, department, manager, office, and phone number for a number of people. Each entry in N-best list 212 typically includes the full name identified from the speech signal, a confidence level for the recognition of that name based on the utterance, and a pointer to the database entry corresponding to the name.

Application module 216 receives the N-Best list 212 and examines it to determine if any of the entries in the list have a confidence level that exceeds some minimum required level. If at least one of the entries has a high enough confidence level, application module 216 selects one or more. N-Best entries for confirmation. In an illustrated embodiment, the system may prompt a user to confirm one or more recognitions using a voice or keypad input (not shown in FIG. 2). If the recognition is confirmed then the recognition process is complete.

If the selected name or names are denied by the caller or user, the system of the present invention stores the results of this recognition iteration as previous iteration results 218. The stored results are used during a second or subsequent recognition iteration.

If the N-Best list received by the application module 216 does not have any entries with sufficiently high recognition confidence, the recognition fails and the N-Best list is rejected without storing the results.

The recognition process can be repeated following recognition failure or misrecognition where the recognition is denied by the user. During a second or subsequent iteration of recognition, the present invention uses the results of the first iteration to select an entry for confirmation by the user. This reduces the burden on the user by making a better selection based on the context of the first iteration.

Figure 3:
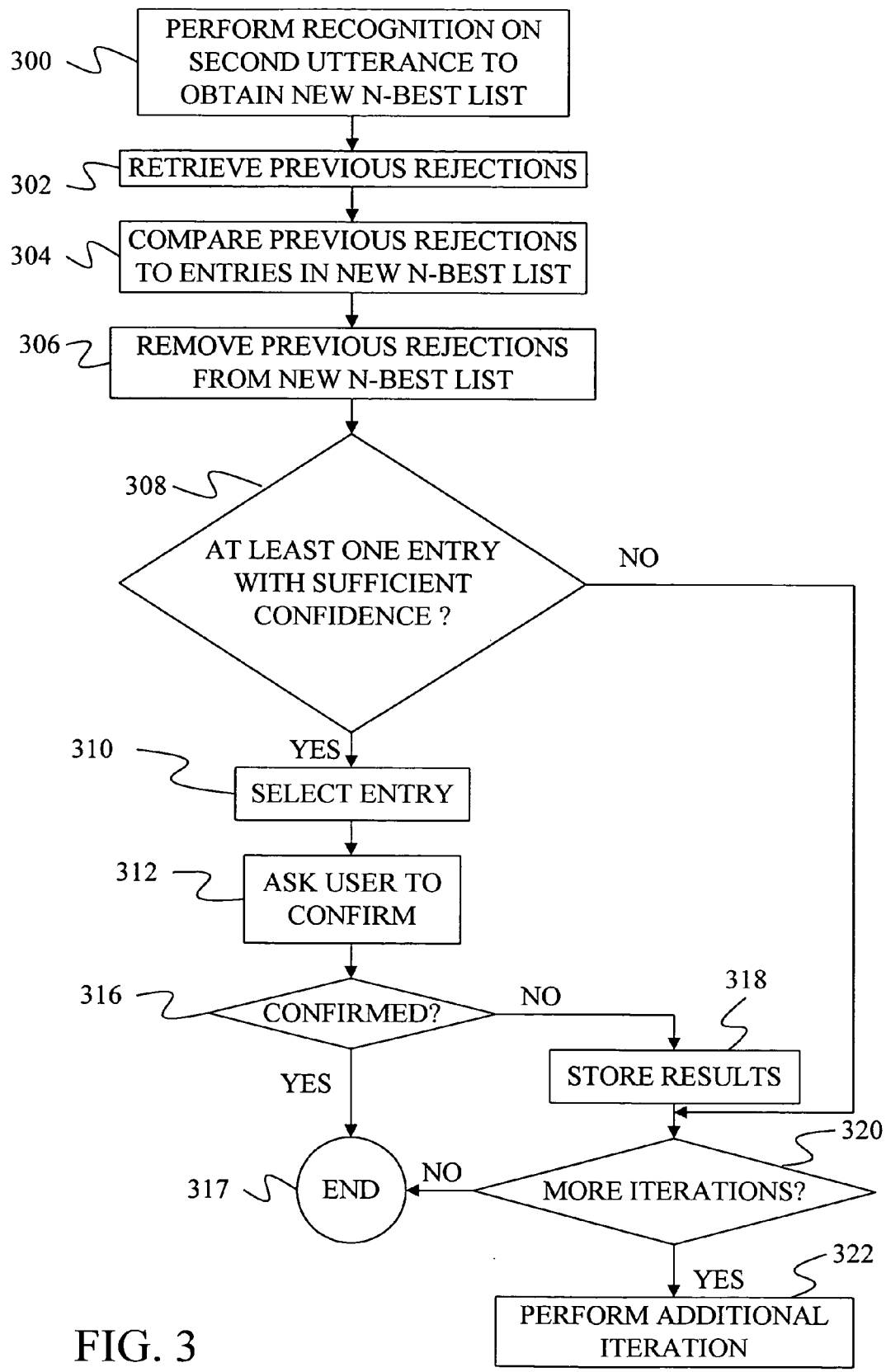
FIG. 3 is a flow diagram illustrating an embodiment of a recognition application using recognition information from a previous iteration to eliminate recognitions which have been previously rejected or denied.

FIG. 3 shows a flow diagram of a method of performing a second iteration of recognition and entry selection by utilizing the results of the first iteration of recognition. In the embodiment shown in FIG. 3, the application uses previous iteration results 218 such as selections which were denied by the user to eliminate these entries from possible selections to avoid repetition of previously denied or rejected selections. In step 300 of FIG. 3, recognition module 204 is used to perform speech recognition on a second utterance from the user, and thereby produce a second N-best list. At step 302, application module 216 accesses previous iteration results 218 to retrieve previously selected entries that were rejected by the user in the previous iteration.

At step 304, application module 216 compares the previously selected entries to the entries in the second N-best list. If a previously rejected entry is found in the second N-best list, it is removed from the list at step 306.

For example, if "Dave Ollason" had been rejected in a previous iteration, the selection module retrieves "David Ollason" and compares it to entries in the second N-Best list. If the rejected entry is on the N-Best list for the second iteration, it is removed or deleted. By removing this entry, the present invention avoids duplication of the rejected recognition. Thus in the illustrated embodiment, David Ollason is removed or deleted from the N-best list, making it impossible for application module 216 to select it for confirmation during the second iteration of recognition.

At step 308, application module 216 determines if at least one entry in the N-Best list has a high enough confidence value to warrant obtaining confirmation from the user. If the system is able to provide a possible recognition, the system selects an entry at step 310 and prompts the user to confirm the recognition or result as illustrated by block 312. If the recognition is confirmed at step 316, the recognition process is complete and ends at step 317.

Otherwise, if the recognition is denied by the user, the iteration results are stored as illustrated by block 318. Under one embodiment, the results from all of the previous iterations are maintained in previous iteration results 218 to provide a fuller context for the next iteration.

For example in the illustrated embodiment of FIG. 3, the denied or rejected name or entry is stored and used to discard previous misrecognitions. In an illustrative embodiment, the N-Best list or names not selected are stored and used for selection of entries or names in a subsequent iteration using alternate recognition attributes as will be described.

If the recognition fails at step 308, for example, the application is unable to provide an entry with sufficient or minimum confidence or is not confirmed at step 316, application module 216 determines whether a further iteration should be performed at step 320. If a further iteration is not desired, the process ends at step 317. If another iteration is desired, a subsequent iteration is performed at step 322. This further iteration can take the form of any of the techniques shown in this specification.

Figure 4:
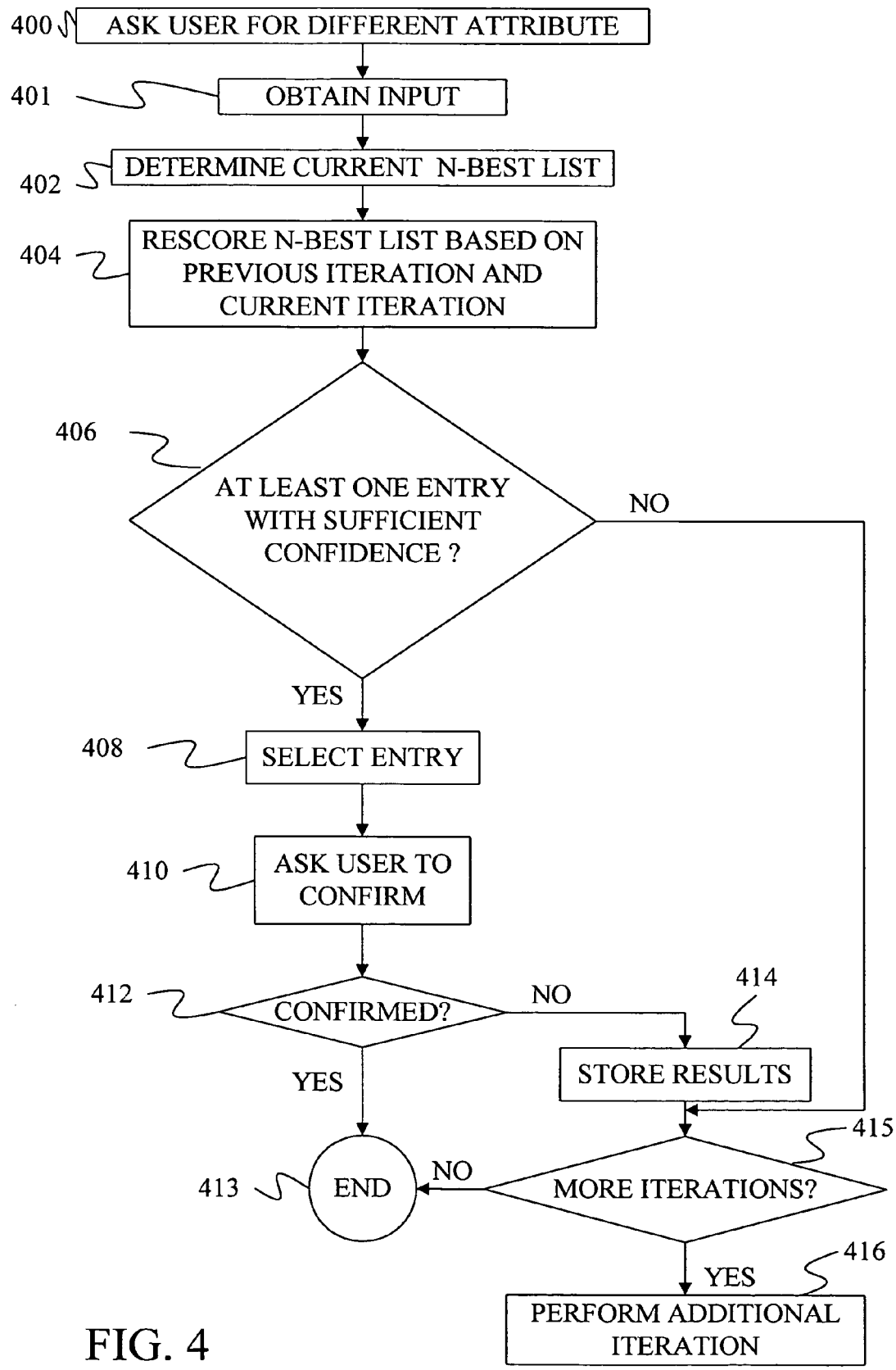
FIG. 4 is a flow diagram illustrating an embodiment of a recognition application which uses recognition information from a previous recognition iteration to rescore entries of an N-Best for a subsequent iteration.

FIG. 4 illustrates an embodiment of a speech recognition application that uses context information from previous recognitions to rescore an N-best list generated using different input attributes during a second or subsequent iteration of recognition. In particular, in the illustrated embodiment for a voice dialer application, if the system fails to recognize the name of the person, then the system can use a different attribute such as the spelling of the last name, an e-mail address, work location, department, group or business unit or other attributes to enhance confirmation success. In the method of FIG. 4, the N-best list generated using this different attribute is used in combination with the N-best list obtained and stored during the first or previous iteration in order to better identify an entry for confirmation by the user.

In the embodiment shown in FIG. 4, the application prompts the user to input the different attribute as illustrated by block 400. At step 401, the system obtains the user input and at step 402, the system provides an N-Best list based upon grammars corresponding to the different attributes based on the user input. In one particular embodiment, the speech recognition module uses spelling grammars of the database to generate an N-Best list of last names that best match the spelling provided by the user.

As illustrated by block 404, the N-Best list of the first iteration is rescored based upon the N-best list obtained using the alternative attribute. In particular, if an entry is found in both of the N-best lists, its confidence level is set to its maximum value in the N-best list of the first iteration. Alternatively the N-Best list of the second iteration can be rescored based upon the N-Best list of the first iteration. In that case, if an entry is found on both lists, the confidence value for the entry in the N-best list of the second iteration is set to its maximum value.

At step 406, application module 216 examines the rescored N-best list to determine if any of the entries have a high enough confidence level If at least one entry has a high enough confidence level, an entry in rescored N-best list is selected for confirmation at step 408 and the system prompts the user to confirm the selected entry at step 410.

If the user confirms the selected entry at step 412, the recognition process is complete at step 413. If the user does not confirm the selected entry the application module 216 stores the results as illustrated by block 414.

Otherwise if none of the entries have a high enough confidence value, the N-Best list is disregarded. If recognition fails at step 406 or if the recognition is not confirmed at step 412, the application module 216 determines whether to perform a subsequent iteration at step 415. If an additional iteration is not desired, the process ends at step 413. If an additional iteration is performed as illustrated by block 416, the application module 216 uses the results from a previous iteration or iterations.

The new iteration started at step 416 may use any of the techniques of the present invention or any other suitable techniques. For example, the non-selected entries or N-Best list from one iteration can provide a limited grammar for the recognition module 204 to limit the scope of a subsequent recognition iteration using an alternate or different input attribute.

Figure 5:
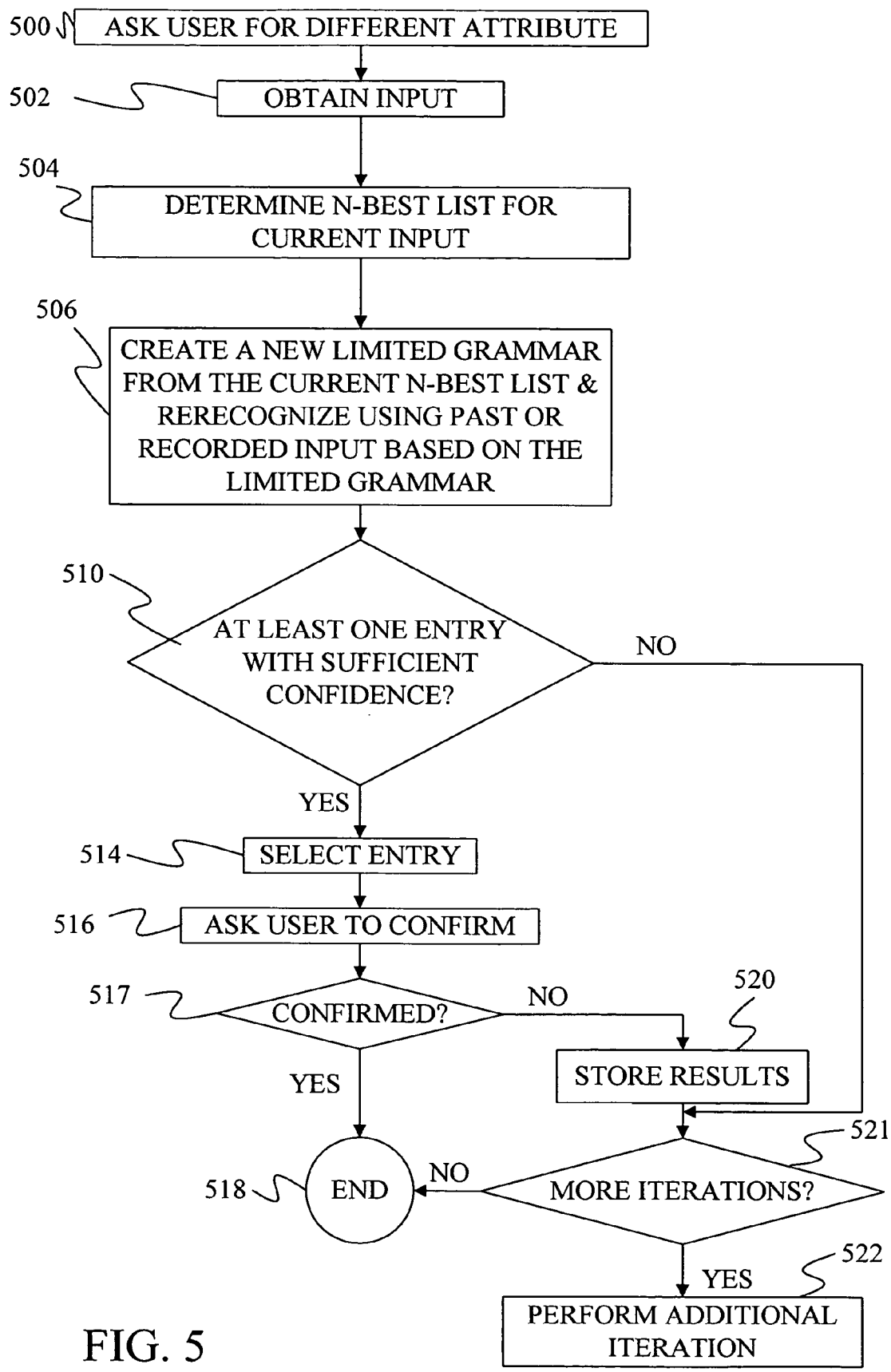
FIG. 5 is a flow diagram illustrating an embodiment of a speech recognition application using a subset of database records for recognition or re-recognition of a speech input or utterance.

FIG. 5 illustrates an embodiment of the present invention that uses a recorded input from a first iteration to re-recognize the recorded input based upon an N-Best list generated in a second iteration. In the method of FIG. 5, the user is asked for a different attribute at step 500 as part of the second iteration of recognition. In response, the user provides the different attribute at step 502. Examples of such attributes include things such as the spelling of the last name of a person, work location, department, group or business unit.

Based on this different attribute, recognition module 204 provides a current N-best list at step 504. This current N-best list is then provided to speech recognition module 204 to create a new limited grammar from the current N-Best list, such that speech recognition module 204 will only consider those entries in the grammar as possible matches.

At step 506, speech recognition module 204 applies an input for a previous search attribute for example a recorded version of the user's speech input acquired during the first iteration to the limited grammar defined during the second iteration to generate a new N-best list for recognition. In some embodiments, this is considered a third iteration of recognition. Thus, in this third iteration of recognition, the speech recognizer uses the N-best list generated in the second iteration to constrain the search space during a recognition of the speech signal obtained during the first iteration.

At step 510, the method determines if there is at least one entry with a high enough confidence level to be selected. If there is an entry with a high enough confidence level, an entry is selected at step 514 and the user is asked to confirm the selection at step 516. If the user confirms the selection at step 517, the process ends at step 518. If the selection is denied by the user, then the results are stored at step 520.

If there was not at least one entry with a high enough confidence level, or the selection was denied the application module 216 determines if more recognition iterations should be performed at step 521. If additional recognition iterations are not performed, the process ends as illustrated by step 518. Alternately if desired an additional iteration is performed at step 522. The additional iteration may use any combination of the techniques of the present application or any other suitable techniques.

As previously described the speech recognition application can use different data attributes of the database or directory to enhance recognition confidence. For example upon failure or misrecognition, the application can use another search criteria. In an embodiment of the application, the application can request that the user spell the last name of the contact or request other information such as an e-mail alias, business unit, group or location which is used to enhance recognition confirmation and success for subsequent iterations.

Although the present invention has been described with reference to preferred embodiments, workers skilled in the art will recognize that changes may be made in form and detail without departing from the spirit and scope of the invention.

What is claimed is:

1. A speech recognition system comprising:
   a computer storage media and a processing unit to implement instructions stored on the non-transitory computer storage media;
   a contacts list or directory including contacts having a plurality of contact attributes stored on the non-transitory computer storage media;
   a recognition module including instructions stored on the non-transitory computer storage media and executable by the processing unit to receive a first input utterance corresponding to a first contact attribute and provide a first N-Best list of one or more data entries in a first iteration for the first input utterance using a first grammar comprising grammars associated with contact records of the contacts list or directory;
   an application module including instructions stored on the non-transitory computer storage media and executable by the processing unit to utilize the contact records associated with the first N-Best list to provide a second subset grammar or grammars for a second contact attribute limited to only the contacts corresponding to the N-Best entries of the first N-Best list and the recognition module is configured to receive a second input utterance corresponding to the second contact attribute and process the second input utterance using the second subset grammar or grammars to recognize the second contact attribute to provide a second N-Best list; and
   an application component including instructions stored on the non-transitory computer storage media and executable by the processing unit to select or order the one or more N-Best entries from the first or second N-Best lists using information associated with the first or second iterations.

2. The speech recognition system of claim 1 wherein the application component retrieves misrecognitions from the first N-Best list of the first iteration and eliminates the misrecognitions from the second N-Best list of the second iteration.

3. The speech recognition system of claim 1 wherein the first and second contact attributes are different attributes.

4. The speech recognition system of claim 1 wherein the application component restores one of the first or second N-Best lists based upon the other of the first and second N-Best lists.

5. The speech recognition system of claim 1 wherein the second input utterance comprises a rerecognition of a previous input utterance.

6. The speech recognition system of claim 1 wherein the first input utterance is a voice input of a name spelling and the second input utterance is a voice input of a full name.

7. The speech recognition system of claim 1 wherein the first and second contact attributes correspond to a name and a spelling of the name.

8. A method for retrieving a contact from a contact list or directory comprising the steps of:
   receiving a first input utterance from an audio input device coupled to a computing device;
   recognizing the first input utterance using a processing unit of the computing device and outputting a first N-best list corresponding to the first input utterance using a first grammar or grammars comprising grammars associated with contacts in the contact list or directory during one recognition iteration;
   creating a second grammar or grammars for a second input utterance using the processing unit of the computing device and a subset of grammars limited to a subset of the contacts corresponding to one or more entries of the first N-Best list;
   receiving the second input utterance from the audio input device;
   recognizing and outputting a second N-Best list corresponding to the second input utterance using the processing unit of the computing device and the second grammar or grammars during a different recognition iteration; and selecting a recognition result for the different iteration using the processing unit of the computing device and the information for the one recognition iteration and the second N-Best list from the different recognition iteration.

9. The method of claim 8 wherein the step of selecting the recognition result for the different iteration using the information for the one iteration and the second N-Best list for the different iteration comprises the steps of:

receiving feedback that a recognition result or results identified during the one recognition iteration is incorrect;

eliminating the incorrect recognition result or results identified during the one recognition iteration from the second N-Best list for the different recognition iteration; and selecting the recognition result from the second N-Best list for the different recognition iteration having the incorrect recognition result or results deleted.

10. The method of claim 8 comprising the steps of:

rescoring one of the first or second N-Best lists corresponding to the one recognition iteration or the different recognition iteration based upon the other of the first or second N-Best lists; and selecting the recognition result based upon the rescored N-Best list.

11. The method of claim 8 wherein the first input utterance for the one recognition iteration corresponds to a first contact attribute and the second input utterance for the different recognition iteration corresponds to a second different contact attribute.

12. The method of claim 11 wherein the first and second contact attributes correspond to a name and a spelling of the name.

13. The method of claim 8 wherein the first N-Best list for the one recognition iteration corresponds to a name spelling and the second N-Best list for the different recognition iteration is generated based upon the second grammar or grammars corresponding to the contact records for the N-Best list entries of the first N-Best list for the name spelling.

14. The method of claim 8 wherein the different recognition iteration is a rerecognition of a recording of a previous full name voice input.

15. The method of claim 8 and comprising
recording the first input utterance; and
rerecognizing the recorded first input utterance following recognition of the first and second input utterances during the one recognition iteration and the different recognition iteration.

16. A method comprising:

receiving a first input utterance from an audio input device coupled to a computing device to retrieve a contact from a contact list or directory;

processing the first input utterance using a processing unit of the computing device and using a first grammar comprising grammars associated with contacts of the contact list or directory for a first contact attribute to recognize the first input utterance during a first recognition iteration;

generating a first N-best list for the first contact attribute;

storing information from the first recognition iteration on a non-transitory data storage media;

processing data for one or more entities of the first N-best list associated with the first input utterance using the processing unit of the computing device and generating a second grammar comprising a subset grammar or grammars limited to contact records associated with the one or more entries of the first N-best list;

processing a second input utterance from the audio input device using the processing unit and the second grammar for a second contact attribute to recognize the second input utterance during a second recognition iteration wherein the first and second attributes correspond to different contact attributes of the contact records of the contact list or directory;

generating a second N-Best list corresponding to the second input utterance for the second contact attribute; and selecting a recognition result for the second iteration using the second N-Best list to provide the contact from the contact list or directory corresponding to the second input utterances.

17. The method of claim 16 wherein the first and second input utterances correspond to a contact name and a spelling of the contact name.

18. The method of claim 16 wherein the first and second contact attributes are different attributes.

* * * * *

UNITED STATES PATENT AND TRADEMARK OFFICE
CERTIFICATE OF CORRECTION

| | | |
|---|---|---|
| PATENT NO. | : 7,809,567 B2 | Page 1 of 1 |
| APPLICATION NO. | : 10/897817 | |
| DATED | : October 5, 2010 | |
| INVENTOR(S) | : Yun-Cheng Ju et al. | |

It is certified that error appears in the above-identified patent and that said Letters Patent is hereby corrected as shown below:

In column 8, line 36, in Claim 4, delete "restores" and insert -- rescores --, therefor.

Signed and Sealed this
Third Day of May, 2011

David J. Kappos
*Director of the United States Patent and Trademark Office*